Patented May 14, 1946

2,400,272

UNITED STATES PATENT OFFICE 2,400,272

BARIUM CHROMATE PIGMENTS AND METHODS OF PREPARING THE SAME

James D. Todd, Louisville, Ky., assignor to Kentucky Color and Chemical Company, Louisville, Ky., a corporation of Kentucky No Drawing. Application February 19, 1942, Serial No. 431,494

7 Claims. (Cl. 23—56)

This invention relates to pigments and their preparation, and more particularly, to pigments containing barium chromate especially adapted for use in primers for preventing the corrosion of metallic surfaces as suggested in British Patent #370,949 of April 11, 1932.

While barium chromate has been proposed as an ingredient of such primers, the physical characteristics and harmful impurities present in such chromate, as prepared by processes known heretofore, have militated against its satisfactory employment and have compelled the use of the less satisfactory chromates of lead and zinc. Because of the manner of operation of such primers which are particularly adapted to the protection of relatively highly active metals such as aluminum and magnesium, the physical characteristics and the degree of purity are highly important. In operation, such primers combine with moisture to form a chromate solution which protects the base metal. If the chromate be in such form that it will not readily dissolve in the water or contains impurities which will dissolve in the water and act as corrosives, the primer is of considerably less benefit.

Some of the processes hitherto proposed for the preparation of barium chromate have involved the use of the chromates of sodium, calcium and potassium in combination with the chlorides, nitrates or hydroxides of barium. When chlorides and nitrates are used, undesirable by-products result such as the nitrates and chlorides of sodium and potassium which cannot be eliminated to the desired degree from the final pigment. Consequently, they operate as corrosives, in the pigment, rendering it unsatisfactory for use, particularly on aluminum and magnesium. Moreover, the numerous washings that are required to reduce such impurities to a minimum remove considerable quantities of the precipitated chromate, which is somewhat soluble, and reduce the yield.

When the hydroxides are employed in place of the chlorides or nitrates, the by-product is the hydroxide of sodium, calcium or potassium. Thus the chromate is precipitated in a mixture which always has an exceedingly high pH value and in a form that is not satisfactory for use in pigments of the type described. The precipitation of barium chromate in a mixture that is always alkaline has been found to cause the formation of relatively large particles of chromate which tend to occlude the hydroxide in a manner whereby it cannot be removed by washing. Consequently, such chromates are not satisfactory for use as primers because of the corroding action of the occluded alkali.

Fusion methods for the preparation of chromates have been proposed. The resulting product is dense, compact and entirely unsuited for use as a pigment. As such fusions are made in the presence of salt, the resultant products are always characterized by a high chloride content which prevents the use of the product as a pigment.

In addition to the aforesaid impurity content, barium chromate, as heretofore made, has occurred in the form of relatively large particles which have been unsuited for satisfactory use in pigments of the type herein described.

It is an object of my invention to provide a new and more desirable form of barium chromate that is of particular advantage in pigments of the metallic primer type.

A further object of my invention is the provision of novel methods of preparing barium chromate wherein the yield is increased, the resultant product is purer than products heretofore produced and is especially characterized by a minimum content of chlorides, nitrates and other impurities which act as corrosives.

The present invention contemplates the preparation of barium chromate by combining one or more starting compounds of the metal, such as the carbonate, oxide or hydroxide, with chromic acid under predetermined conditions whereby no undesirable by-products, which would tend to contaminate the final precipitate and react against its use in primers of the type described, are obtained, and the chromate is produced in a physical form that is especially suitable in primers of the type described. Generally, a slurry or mixture of the starting compound is prepared with water, the mixture having a pH value in the alkaline range. Preferably, the mixture, when the carbonate is used, is treated with sufficient carbon dioxide to change the pH value over into the acid range wherein the reactivity of the starting compound is apparently increased, resulting in a more complete reaction. This increased reactivity is believed to be due to the temporary formation of bicarbonates or acid carbonates which are more soluble and react more readily with the subsequently added chromic acid. Chromic acid is added, and the excess of carbon dioxide removed by stirring, boiling or aerating. The subsequent precipitate may or may not be washed prior to drying. The precipitated chromate so recovered is substantially devoid of harmful impurities and the yield is exceedingly high.

The chromate is in the form of relatively fine particles, at least 80% of which are less than two microns and 60% are less than one micron as determined by conventional methods based on Stokes' law.

Because of such fineness and substantially complete freedom from impurities, the pigment disperses readily in a vehicle, and remains well in suspension. If impurities are present, they tend to cement the small particles into agglomerates during drying, thus increasing the apparent particle size with a greater tendency to settle. Additionally, such pigment functions particularly well in a vehicle of the type described where it combines with moisture to produce a chromate solution and has actually been found by prolonged tests to provide more effective protection over long periods of time.

When the starting compound is barium hydroxide, it is unnecessary to use carbon dioxide because the hydroxide is more soluble than the carbonate. In such case, a slight excess of chromic acid is added so that the pH value of the mixture upon completion of the precipitation is in the acid range. While in the case of the carbonate as a starting compound, the mixture or slurry is acid prior to the addition of the chromic acid, and in the case of the hydroxide, the mixture is initially alkaline, it has been found that the chromates precipitated therefrom are substantially identical in physical structure, provided that, in each case, the mixture upon the completion of the precipitation is acid; and are entirely different from the chromates precipitated in a mixture wherein the final pH value is in the alkaline range.

As examples of the methods for preparing the chromates of my invention, attention is called to the following:

Example 1

197.5 parts of high-grade barium carbonate, so-called "precipitated barium carbonate", were added to 500 parts of water, the mixture being heated to between 80 and 100° C., and stirred for about one hour. After dilution with 500 to 800 parts of water, and cooling to 25 to 35° C., carbon dioxide was added in sufficient amount to change the pH value to the acid range.

A solution of 100 parts of chromic acid in 200 parts of water at 25° to 35° C. was added over a period of from 15 to 30 minutes. In some cases, it was found that the mixture became too thick and viscous for proper agitation. Additional water was then added. At this stage, the pH value was about 2.0 to 3.0, substantially all the carbon dioxide having been liberated during the addition of the chromic acid. The last traces of the carbon dioxide were removed by aerating or boiling, and the resultant product washed by decantation to a pH value of between 5.0 and 6.0. The resulting precipitate was a light-colored yellow precipitate of very fine particle size. 80% of the particles were less than 2 microns, and 60% were less than 1 micron as determined by conventional methods based on Stokes' law. The specific gravity was about 4.2, and the product was found to analzye approximately 60% barium oxide and 37.6% $CrO_3$, indicating a slightly basic barium chromate of high purity. The product was found to be substantially free from harmful impurities such as soluble chlorides, sulfates and nitrates.

In lieu of precipitated barium carbonate, natural barium carbonate, such as "Witherite No. 2—airfloated," may be employed. In such case, the chief impurities are about 2½% barium sulfate and 2% silica. Silica is not harmful as it is a common ingredient of primers and protective coatings. Since barium sulfate is also commonly used in the form of barytes or "blanc fixe," a commercial Witherite even up to 10% barium sulfate may be employed.

If desired, the addition of carbon dioxide may be omitted, reliance being had upon the carbon dioxide generated from the carbonate by the chromic acid. However, it has been found that the reaction is not as complete as desired, and the final product may be contaminated with occluded particles of the starting compound.

Example 2

Barium hydroxide or barium oxide, which would be slaked to barium hydroxide, may be substituted for the barium carbonate of Example 1. In the case of barium hydroxide, approximately 315.5 parts of commercial $Ba(OH)_2 8H_2O$ are used; and in the case of barium oxide, approximately 153.4 parts are used. In this case, treatment with carbon dioxide may be omitted, it being only necessary that sufficient chromic acid be added to insure that the pH value of the final mixture upon completion of the reaction is in the acid range. Since no carbon dioxide is employed, it is unnecessary to blow or heat to remove any excess thereof.

Barium chromate produced by the methods herein described has been found to be especially valuable as a pigment in primers of the type described, primarily because of its very fine particle size and shape and absence of water-soluble impurities. If desired, this pigment may be used singly or it may be combined in desired proportions with strontium chromate of the type described in my copending application to attain any desired degree of solubility within limits so that the protective action of the $CrO_3$ ions may remain effective over longer or shorter periods and the compound pigment balanced to fit the conditions of exposure.

While special reference has been made herein to the use of the barium chromate of this invention in connection with the protection of relatively active metals, such as magnesium, it is to be understood that it is applicable as well to the protection of any metallic surfaces subject to corrosion, such as iron and steel surfaces and the like.

It will be noted, in Examples 1 and 2, that approximate molecular proportions of acid and barium compound are employed. For example, a high grade barium carbonate, such as precipitated barium carbonate, runs approximately 98% in strength; hence 197.5 pounds of this grade, as in Example 1, is equivalent to .98 mol. Commercial chromic acid runs better than 99½% pure so that 100 pounds approximate .995 mol. Thus, there is a very slight excess of acid over molar proportions.

Having described my invention, I claim:

1. A method of preparing normal barium chromate of relatively fine particle size and substantial freedom from ingredients harmful to the use of the chromate in metallic primers for the protection of corrodible metals, comprising: mixing a barium compound, which is selected from a group consisting of the oxide, hydroxide and carbonate and which is suspended in water, with chromic acid in the approximate stoichiometric proportions necessary to form the normal chromate and in an environment substantially free of alkali metal ions to effect a reaction which directly forms a precipitate of normal barium chromate, the hydrogen-ion concentration of the mixture being acidic after the chromic acid addition and remaining acidic to the end of the reaction; the ingredients employed being substantially free of elements which form alkali metal compounds and water soluble chlorides, nitrates and sulphates, whereby only easily separable by-products such as carbon dioxide and water are formed; and separating the precipitated chromate from the mixture.

2. The method of claim 1 wherein: The barium compound suspension is treated with carbon dioxide gas to establish an acidic pH in the suspension prior to the acid addition.

3. The method of claim 1 wherein: The barium compound suspension is treated with carbon dioxide gas to establish an acidic pH in the suspension prior to the acid addition; and the excess carbon dioxide is removed after the acid addition but before the precipitate is separated from the reaction mixture.

4. The method of claim 1 wherein: A slight excess of chromic acid over stoichiometric proportions is added to establish, at the end of the reaction, a pH value substantially below 5.0.

5. The method of claim 1 wherein: A slight excess of chromic acid over stoichiometric proportions is added to establish, at the end of the reaction, a pH value substantially below 5.0; and the pH of the reaction mixture is adjusted to approximately 5.0 to 6.0 upon the completion of the reaction and before the separation of the precipitate.

6. The method of claim 1 wherein: A slight excess of chromic acid over stoichiometric proportions is added to establish, at the end of the reaction, a pH value substantially below 5.0; and the pH thereafter, and before separating the barium chromate therefrom, is raised substantially to approximate 5.0 to 6.0 by washing the resultant product by decantation in which the solids are permitted to settle, the clear liquid drained off, water added to the remaining liquids and solids, the resulting mixture stirred.

7. The method of claim 1 wherein: The barium compound suspension is treated with carbon dioxide gas to establish an acidic pH in the suspension prior to the acid addition; a slight excess of chromic acid over stoichiometric proportions is added to establish, at the end of the reaction, a pH value substantially below 5.0; and the pH of the reaction mixture is adjusted to approximately 5.0 to 6.0 upon the completion of the reaction and before the separation of the precipitate.

JAMES D. TODD.